(12) United States Patent
Kusuda et al.

(10) Patent No.: US 7,158,618 B1
(45) Date of Patent: Jan. 2, 2007

(54) APPARATUS AND METHOD FOR RECORDING URL TOGETHER WITH VOICE MESSAGE IN A BROWSER EQUIPPED TELEPHONE

(75) Inventors: Rika Kusuda, Yamato (JP); Yoichi Yoshida, Machida (JP); Akira Ohkado, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 09/710,479

(22) Filed: Nov. 11, 2000

(30) Foreign Application Priority Data

Nov. 11, 1999 (JP) ............................ 11-321634

(51) Int. Cl.
*H04M 1/64* (2006.01)

(52) U.S. Cl. .............................. 379/88.17; 379/88.13; 379/93.27; 370/356; 709/204

(58) Field of Classification Search ............ 379/88.17, 379/93.27; 709/204; 704/270, 273; 455/412.1, 455/412.2, 413; 370/352; 701/207
See application file for complete search history.

(56) References Cited

U.S. PATENT DOCUMENTS 5,761,280 A * 6/1998 Noonen et al. .......... 379/93.27
5,799,063 A * 8/1998 Krane ..................... 379/88.17
6,141,413 A * 10/2000 Waldner et al. .......... 379/88.17
6,219,709 B1 * 4/2001 Byford ..................... 709/227
6,226,668 B1 * 5/2001 Silverman .................. 709/204
6,463,149 B1 * 10/2002 Jolissaint et al. ........ 379/88.17

FOREIGN PATENT DOCUMENTS

| JP | PUPA 04-157957 | | 5/1992 |
| JP | 10262124 A | * | 9/1998 |
| JP | PUPA 10-262124 | | 9/1998 |
| JP | PUPA 11-122590 | | 4/1999 |
| JP | PUPA 11-146083 | | 5/1999 |

* cited by examiner

*Primary Examiner*—Gerald Gauthier
(74) *Attorney, Agent, or Firm*—Ference & Associates (57) ABSTRACT

The present invention provides an apparatus and method for, in a browser equipped telephone, transmitting a URL together with a voice message when a called party is set to an answering mode, and allowing URL information to be extracted and passed to the browser when a recorded message is played or reproduced.

15 Claims, 7 Drawing Sheets

Fig. 1

Communication form 1

Fig. 2

Communication form 2

Fig. 3

Communication form 3

Fig. 4

Communication form 4

APPARATUS AND METHOD FOR RECORDING URL TOGETHER WITH VOICE MESSAGE IN A BROWSER EQUIPPED TELEPHONE

CLAIM FOR PRIORITY

This application claims priority from Japanese Application No. 11-321634 filed on Nov. 11, 1999, and which is hereby incorporated by reference as if fully set forth herein.

FIELD OF THE INVENTION

The present invention relates to a browser equipped telephone, and more particularly, to a technique for transmitting a URL (Uniform Resource Locator) of a web page being displayed by the browser of a telephone to a called party's browser equipped telephone which is in an answering mode.

BACKGROUND OF THE INVENTION

As the Internet has widely spread, a browser equipped telephone (multifunction telephone) such as a screenphone has appeared for the purpose of providing easy access to the Internet even if no personal computer is available. In addition to the normal telephone functions, the screenphone typically has WWW browser and electronic mail functions, and can access a web page on the Internet while calling if two lines can be used by a single screenphone. The Working Document for the screenphone issued by the ISRF (Internet Screenphone Reference Forum) on Jun. 8, 1999 (available from "[http://]www.isrf.org" in a PDF format) states that smart cards and online software upgrade will be supported. Therefore, the screenphone is by no means functionally inferior to the personal computer as far as the Internet access is concerned.

If the screenphones as described above are used by both calling and called parties, respectively, it is possible that the parties will talk to each other while viewing the same web page. In this case, the problem is how to communicate to the other party the URL of the page that the one party is viewing. Of course, it is possible to communicate it by means of voice. However, the party to whom the URL is communicated in this manner must thereafter manually enter the URL using keys or buttons of the screenphone, which is troublesome.

To solve the above problem regarding the URL transmission, Japanese Unexamined Patent Publication No. H11-122590 teaches a videophone or TV phone which can cause a desired page to be automatically displayed on the screen of the other party's TV phone. According to this technique, a WWW browser of one TV phone is changed in association with a WWW browser display screen of the other TV phone, and remote control for the WWW browser display screen is realized by incorporating into a WWW browser task an operation for a load HTML file command from the other party.

In addition, though not directly related to the telephone, Japanese Unexamined Patent Publication No. H10-124461 discloses a system and method for simultaneously performing cooperative works on an HTML page (i.e. web collaboration) by two or more users on the Internet. This allows the same HTML page to be simultaneously displayed at a plurality of clients by redirecting the original browser request.

In the browser equipped telephone such as a screenphone, if a called party answers the phone in a moment, both parties could view the same web page at the same time in the manner described, for example, in Japanese Unexamined Patent Publication No. H11-122590. However, if the called party's telephone is set to an answering mode, the caller could not communicate its URL. Although the URL may be recorded as a voice message in the answering mode, then the called party or user would have to first write down the URL recorded by voice (it would make sense to write down the URL rather than memorizing it because, as is well known in the art, a URL consists of a string of many alphanumeric characters) and then manually enter the URL for use by the browser. If it were possible to record a URL together with an associated normal voice message in a form that it could be directly passed to the browser, such a troublesome procedure would not be required.

SUMMARY OF THE INVENTION

The present invention, in accordance with at least one preferred embodiment, provides an apparatus and method for, in a browser equipped telephone, transmitting a URL together with a voice message when a called party is set to an answering mode, and allowing URL information to be extracted and passed to the browser when a recorded message is played or reproduced.

In accordance with another aspect of the present invention, an apparatus is provided in a browser equipped telephone apparatus capable of displaying a web page by a browser, which comprises: an inputter which inputs a URL of a web page; a transmitter which transmits the URL inputted by said inputter in a form that can be distinguished from a voice message; a receiver which receives a URL and associated voice message from the outside; an answerer which records and reproduces the URL and associated voice message received by said receiver; and a decoder which converts into a character format and sends to said browser said URL reproduced by said answerer.

In accordance another aspect of the present invention, a method for recording a URL of a web page in an answering mode is provided in a browser equipped telephone capable of displaying a web page by a browser, which comprises the steps of: inputting a URL; transmitting said URL in a form that can be distinguished from a voice message; receiving a URL and associated voice message from the outside; recording and reproducing the received URL and associated voice message; and converting the reproduced URL into a character format and providing it to said browser.

Furthermore, in another aspect, the present invention provides a program storage device readable by machine, tangibly embodying a program of instructions executable by the machine to perform method steps for recording a URL of a web page in an answering mode in a browser equipped telephone capable of displaying a web page by a browser, the method comprising the steps of: inputting a URL; transmitting said URL in a form that can be distinguished from a voice message; receiving a URL and associated voice message from the outside; recording and reproducing the received URL and associated voice message; and converting the reproduced URL into a character format and providing it to said browser.

In the preferred embodiments of the invention, a URL to be transmitted to a called party from a web page being currently displayed by a browser is fetched automatically. Whether a called party's telephone has a URL function is also checked in advance, because it would be a waste of time to transmit a URL if the called party's telephone does not have the URL function.

For a better understanding of the present invention, together with other and further features and advantages thereof, reference is made to the following description, taken in conjunction with the accompanying drawings, and the scope of the invention will be pointed out in the appended Claims.

DESCRIPTION OF THE PREFERRED EMBODIMENTS

Figure 1:
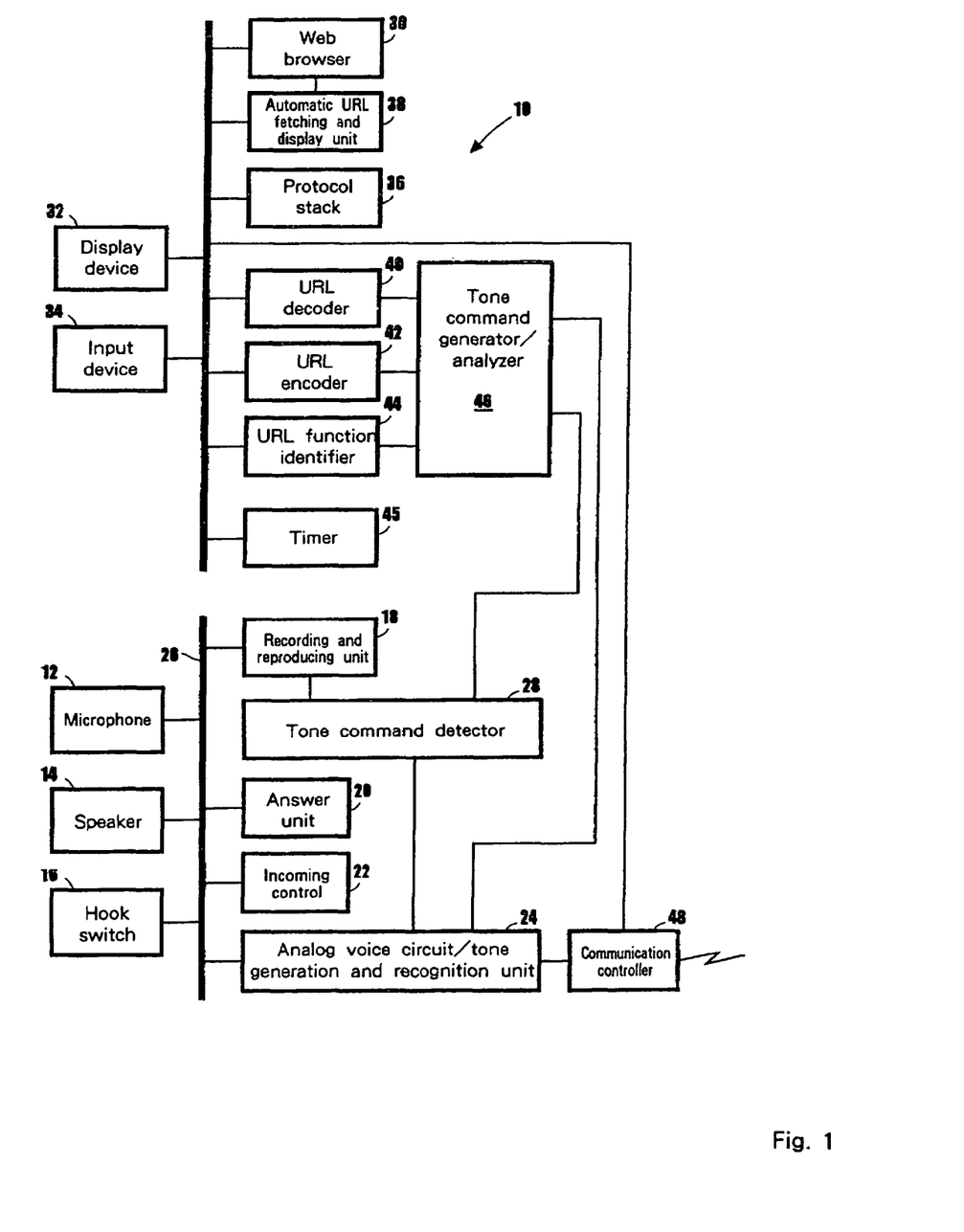
FIG. 1 is a block diagram illustrating the configuration of a browser equipped telephone of the present invention.

Referring now to FIG. 1, an illustrative configuration of a browser equipped telephone according to the present invention is shown. In FIG. 1, a browser equipped telephone 10 may be divided into a telephone circuit section which implements various functions of a conventional telephone, a browser circuit section for implementing a browser function, and a common circuit section shared by the other two circuit sections. The telephone circuit section includes a microphone 12 for voice input, a speaker 14 for voice output, a hook switch 16, a recording and reproducing unit 18 for use in an answering mode, an answer unit 20, an incoming control 22, and an analog voice circuit/tone generation and recognition unit 24. Each of these components, all of which are well known in the art, is connected to a common bus 26. A tone command detector 28 detects a command comprising tones to be recorded when automatic recording is done in the answering mode. As will be described in detail later, a URL is generated as a combination of a tone command (delimiter) and associated data.

The browser circuit section includes a Web browser 30 (although Netscape Navigator and Internet Explorer are popular for the personal computers, a dedicated browser is generally employed for a browser equipped telephone), a display device 32 such as a liquid crystal display (LCD), a protocol stack 36 implementing various protocols such as Point-to-Point Protocol (PPP) and Hypertext Transfer Protocol (HTTP), an automatic URL fetching and display unit 38 for automatically fetching and displaying a URL of a web page being displayed on the display device 32, a URL decoder 40 for converting a URL from a tone signal format into a character format, a URL encoder 42 for converting a URL from a character format into a tone signal format, a URL function identifier 44 for determining whether the telephone of the other party has a URL function, and a tone command generator/analyzer 46 connected to the analog voice circuit/tone generation and recognition unit 24, the tone command detector 28, the URL decoder 40, the URL encoder 42 and the URL function identifier 44 to generate or analyze a tone command. The tone command generator/analyzer 46 has a first function for analyzing a series of tone commands detected by the tone command detector 28, and a second function for generating a tone command to transmit to a called party a URL specified on the Web browser 30 by the user.

The circuit section common to the telephone and browser circuit sections includes an input device 34 and a communication controller 48. The input device 34 is used to enter a URL, a telephone number and various commands and may take any form such as buttons on a telephone, a keyboard, a mouse, a touch panel or the like. The communication controller 48 is connected to an external network to establish and control a connection with a Web site or a telephone of the other party. According to the present invention, the following communication forms may be controlled by the communication controller 48 to transmit the URL and voice.

1. Two Communication Lines

Figure 2:
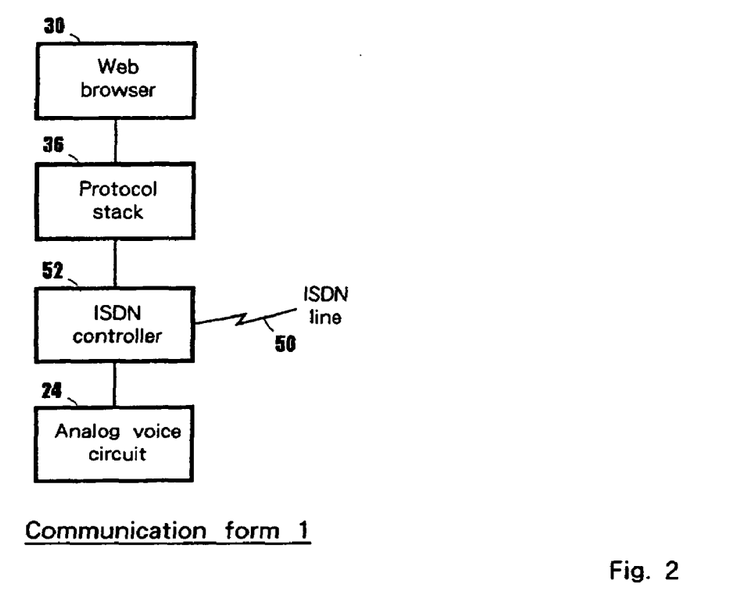
FIG. 2 is a diagram showing a first communication form that can be used by the browser equipped telephone of the present invention.

As shown in FIG. 2, separate communication lines can be reserved for a browser and analog voice, respectively, when an ISDN line 50 is utilized. An ISDN controller 52 may be any well known controller. Two analog lines may be used instead of the ISDN line to achieve the same effect.

2. Analog Line and Modem

Figure 3:
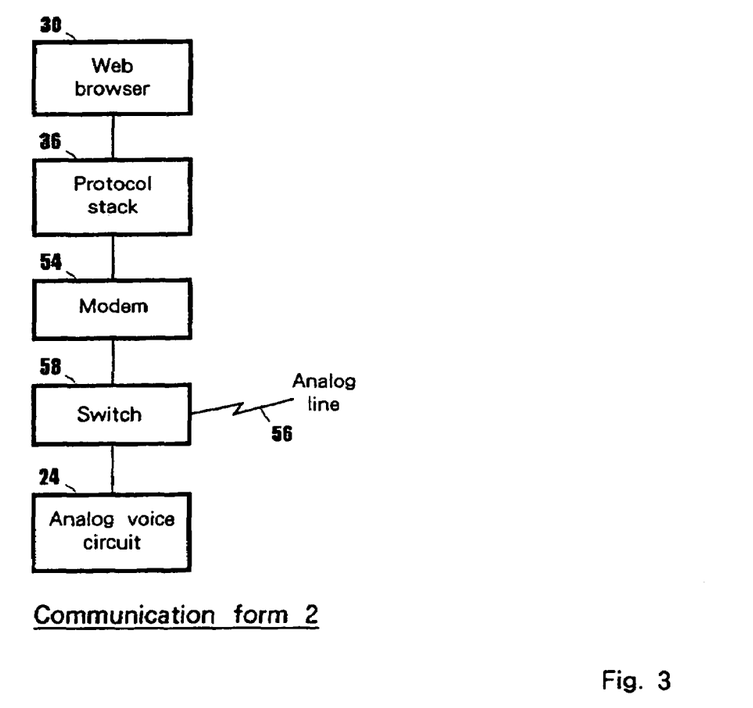
FIG. 3 is a diagram showing a second communication form that can be used by the browser equipped telephone of the present invention.

As shown in FIG. 3, an integrated modem 54 is used and a single analog line 56 is switched between the modem 54 and the analog voice circuit 24 by a switch 58. Currently, this would be the most common communication form for the users who access to the Internet at home.

3. Voice Data Modem

Figure 4:
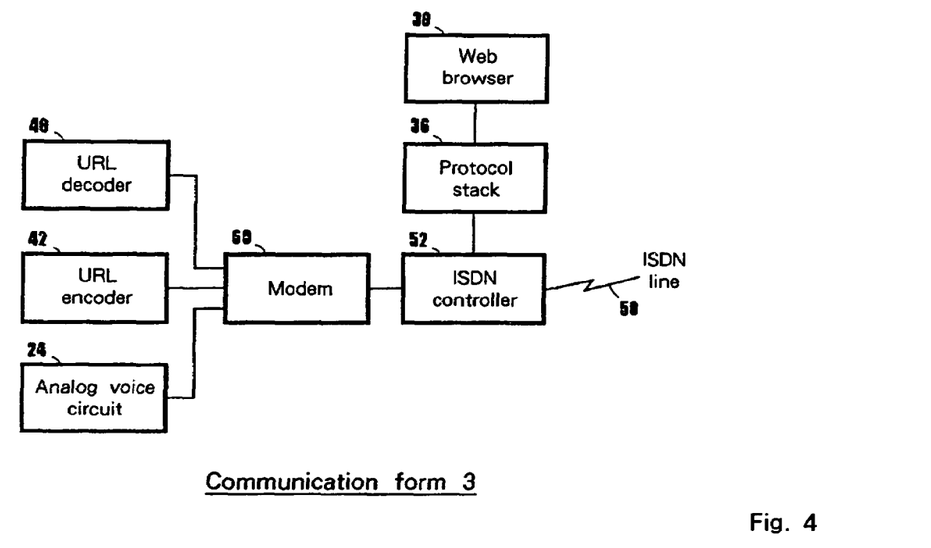
FIG. 4 is a diagram showing a third communication form that can be used by the browser equipped telephone of the present invention.

As shown in FIG. 4, a voice data modem 60 is inserted between the analog voice circuit 24 and a telephone line (e.g. ISDN line). The voice data modem 60 is indicated the beginning and end of a voice to switch voice and signal transmissions so that a URL and voice can be switched. The voice data modem 60 may be U.S. Robotics's 56K Voice Faxmodem External Model #5606.

4. SVD Modem

Figure 5:
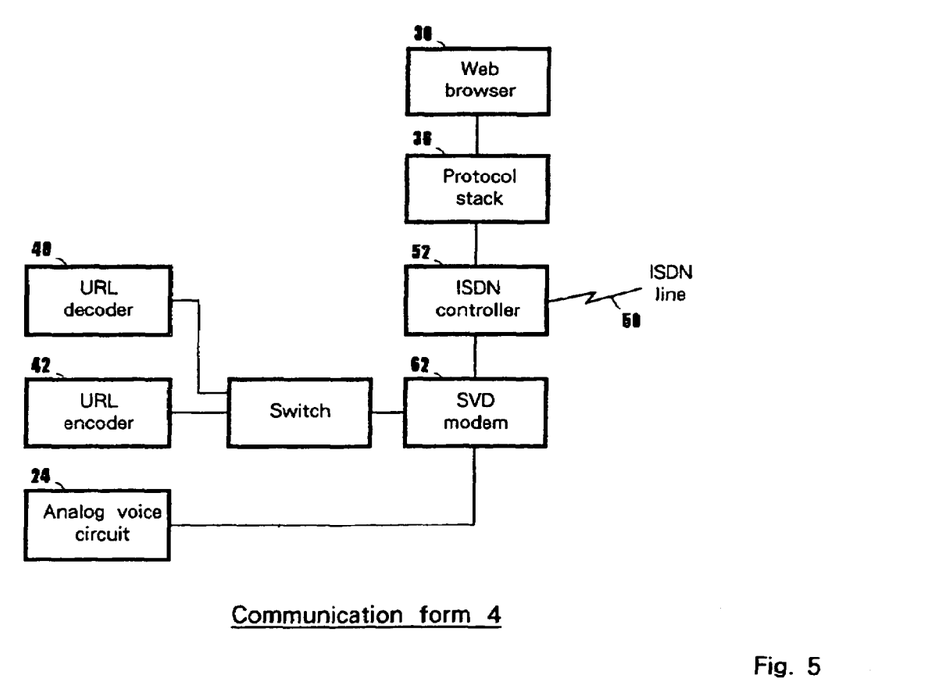
FIG. 5 is a diagram showing a fourth communication form that can be used by the browser equipped telephone of the present invention.

As shown in FIG. 5, an SVD (Simultaneous Voice and Data) modem 62 is employed to implement a data channel dedicated for URL transmission and reception and a voice channel for a telephone call, on a single voice line. The SVD modem 62 may be Hayes's ACCURA 56K External Speakerphone Signature Series.

In addition to the above, one B channel of the ISDN line can be used by switching it between the URL encoder 42, the URL decoder 40 and the protocol stack 36. As described above, the browser equipped telephone of the present invention may be used in any communication form. However, it should be noted that, for the communication forms in FIGS. 2 and 3, the telephones of the calling and called parties may employ any one of these communication forms, but for the communication forms in FIGS. 4 and 5, both the telephones must employ the same form.

Figure 6:
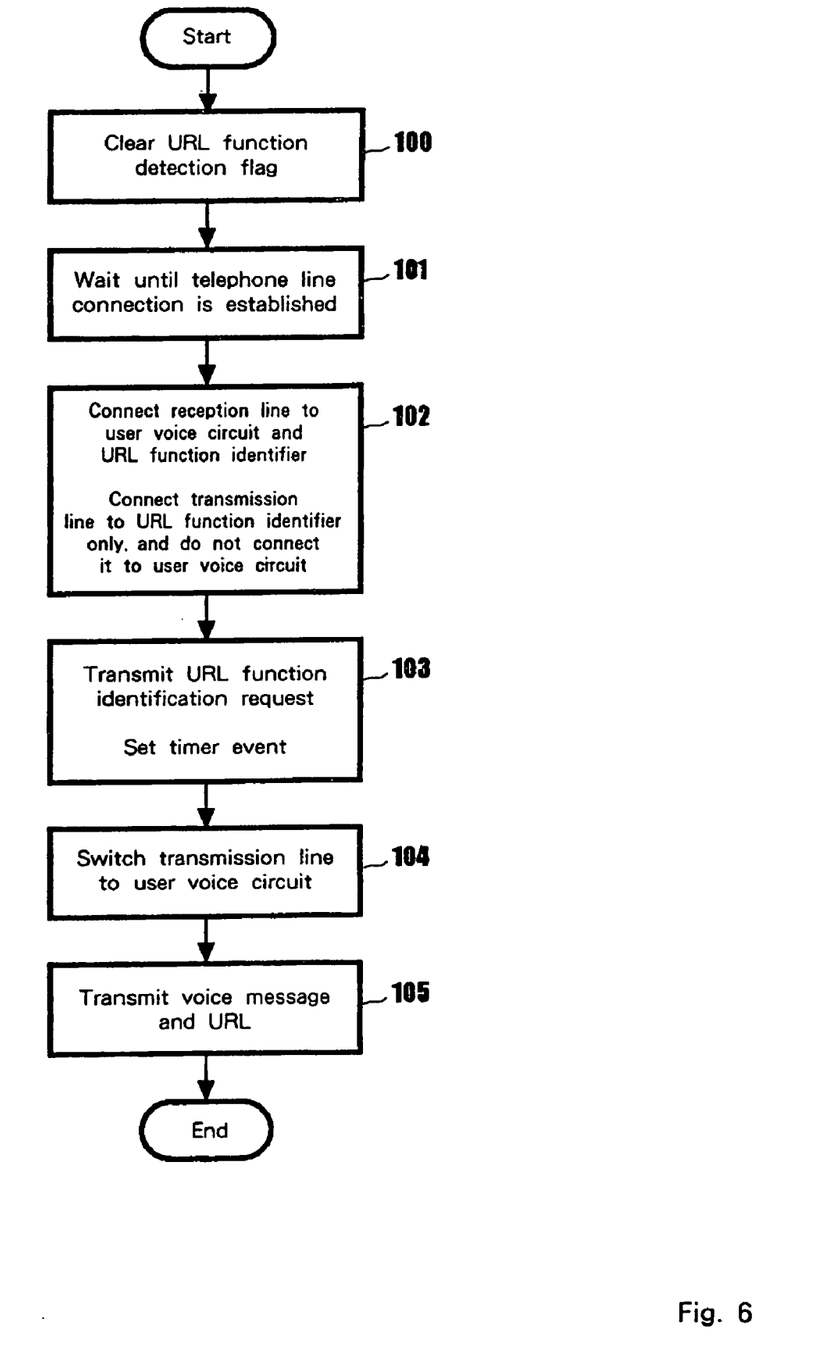
FIG. 6 is a flowchart showing the operation of a calling telephone.
Figure 7:
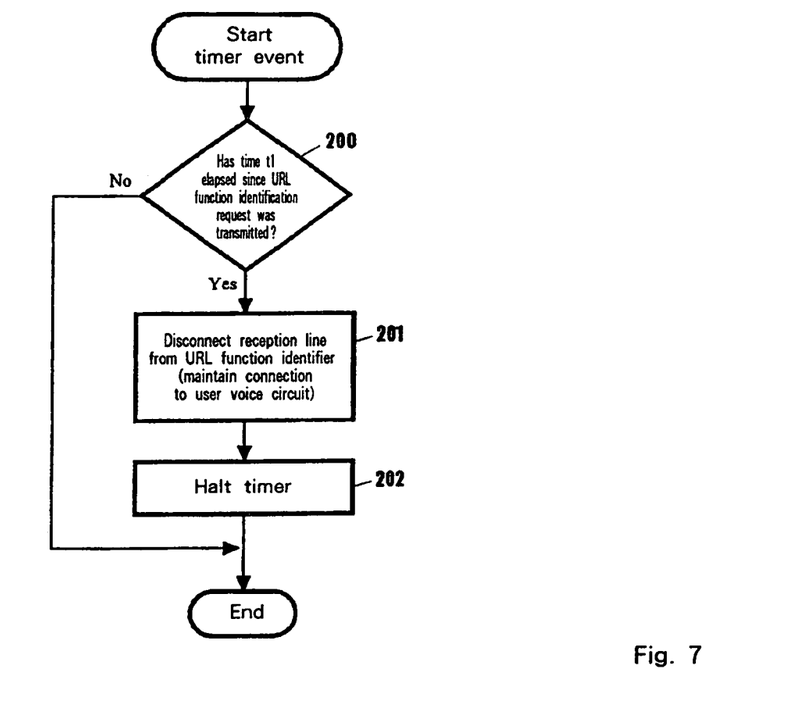
FIG. 7 is a flowchart showing a timer event invoked from the flow of FIG. 6.
Figure 8:
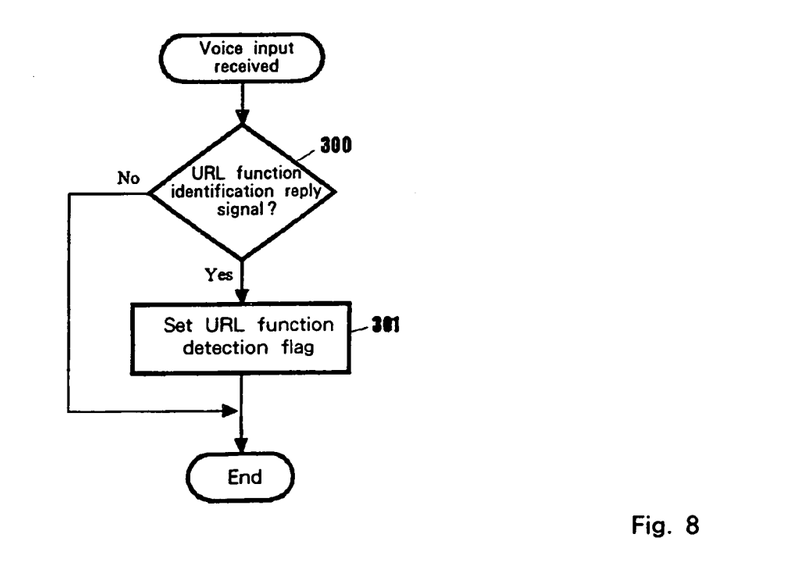
FIG. 8 is a flowchart showing the operation performed when a voice input is detected in the calling telephone.
Figure 9:
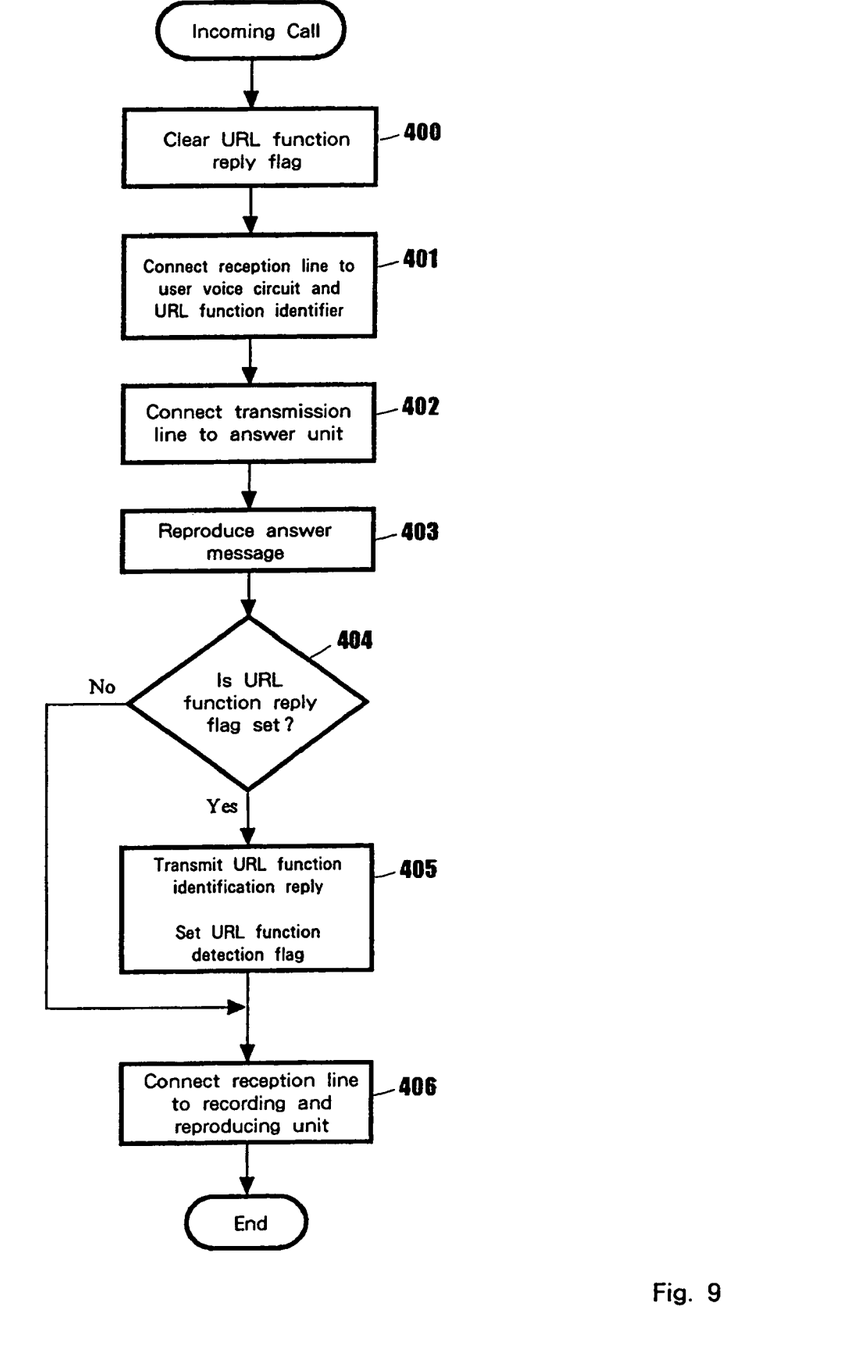
FIG. 9 is a flowchart showing the operation of a called telephone which is in an answering mode.
Figure 10:
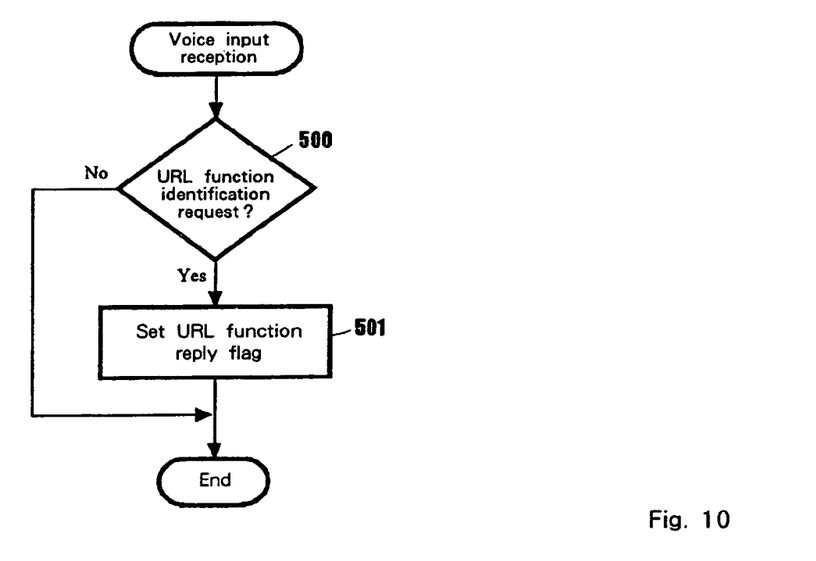
FIG. 10 is a flowchart showing the operation performed when a voice input is detected in the called telephone.

Next, with reference to the flowcharts of FIGS. 6 to 10, the overall operation of the browser equipped telephone according to the present invention will be described. FIGS. 6 to 8 show flows in the calling party while FIGS. 9 and 10 show flows in the called party. Since the present invention is characterized by the URL recording in the answering mode, it is assumed below that the telephone of the called party is in the answering mode.

First, the flow of FIG. 6 is started by bringing the telephone of the calling party to an off-hook state. In the first step 100, a URL function detection flag which indicates that the telephone of the called party has the URL function is cleared. This flag will be explained later with reference to FIG. 8. The next step 101 waits until a telephone line connection is established. Once established, the flow proceeds to step 102 in which a reception line of the caller's telephone is connected to a user voice circuit (handset of the telephone or speaker 14) and to the URL function identifier 44, and a transmission line is connected only to the URL function identifier 44 (not connected to the user voice circuit). In the next step 103, a URL function identification request is transmitted to the telephone of the other party from the URL function identifier 44 via the communication controller 48, and an event is set for a timer 45 (this will be described later with reference to FIG. 7). The URL function identification request is transmitted in the form of tone signals which must be distinguished from any tone signal that may be transmitted from a telephone having no URL function. Therefore, in this embodiment, the following signal sequence having a total period of 2.5 seconds is used to transmit the URL function identification request. Of course, the present invention is not limited to this sequence, and other sequences may be employed.

| | |
|---|---|
| 1000 Hz | 0.5 second |
| No sound | 0.5 second |
| 500 Hz | 0.5 second |
| No sound | 0.5 second |
| 1500 Hz | 0.5 second |

Figure 11:
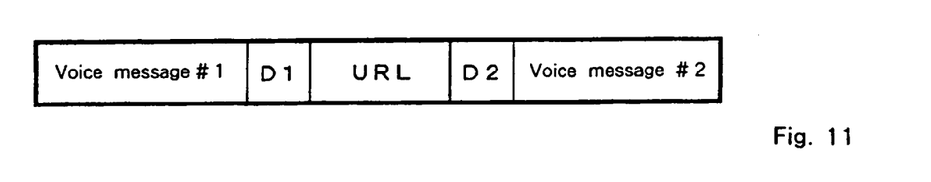
FIG. 11 is diagram showing a message sequence for use in the answering mode which is transmitted from the calling telephone to the called telephone.

Returning from the timer event of FIG. 7, the transmission line is switched to the user voice circuit in step 104 and, in the next step 105, a voice message and, if the telephone of the called party has the URL function (detected by the flow of FIG. 8), URL are transmitted to the telephone of the called party which is in the answering mode as described above. When the telephone of the called party is in the answering mode, an answer message such as "We are out, . . . ," would be received in or near step 103. Listening to the message, the caller transmits a voice message and, if possible, URL in step 105. An example of this transmission signal sequence is shown in FIG. 11. This sequence includes a first voice message (e.g. "Look at this URL.") inputted via the microphone 12, a first delimiter D1 indicating the beginning of a URL, a URL (e.g. "[http://]www.ibm.co.jp/") specified by the user, a second delimiter D2 indicating the end of the URL, and a second voice message (e.g. "Thank you, good bye."). A plurality of URLs may be transmitted in a single sequence by adding the delimiters D1 and D2 before after the URL. It should be noted that the sequence shown in FIG. 11 is merely an example, and the present invention is not limited thereto. The transmission of the sequence shown in FIG. 11 will be described in detail later.

The timer event of FIG. 7 is set periodically (e.g. every second) in step 103 in FIG. 6. In step 200, it is checked whether a predetermined time t1 (e.g. 30 seconds) has elapsed since the URL function identification request was transmitted. This may be done from a difference between a transmission time of the URL function identification request and a current time. If the time t1 has not yet elapsed, the timer event is terminated and control is returned to step 103 in FIG. 6. If the time t1 has elapsed, the timer event proceeds to step 201 in which the reception line is disconnected from the URL function identifier 44 (connection to the user voice circuit is maintained) because it has been determined that the telephone of the other party does not have the URL function. In the next step 202, the timer 45 is halted, and the timer event is terminated.

The flow of FIG. 8 is started when a voice input is received from the telephone of the called party after the URL function identification request has been transmitted in step 103 in FIG. 6. In step 300, it is checked whether the voice input is a URL function identification reply signal. In the present embodiment, this reply signal consists of the following signal sequence having a total period of 2.5 seconds. However, as was noted for the previously described URL function identification signal, other signal sequences may be employed.

| | |
|---|---|
| 500 Hz | 0.5 second |
| No sound | 0.5 second |
| 1500 Hz | 0.5 second |
| No sound | 0.5 second |
| 1000 Hz | 0.5 second |

If the URL function identification reply signal is detected, a flag is set in step 301 to indicate that the URL function has been detected. When this flag is set, a URL transmission button (not shown) is enabled in the caller's telephone to permit the URL transmission. The URL transmission button may take any form such as a dedicated hardware button provided to the telephone 10, a combination of a function button ("#", "*", etc.) and a specified numerical button on the telephone 10, or a software button displayed on the screen of the display device 32. The flow of FIG. 8 is terminated if the URL function identification reply signal is not detected in step 300, or after the URL function detection flag is set in step 301.

The operation of the called party's telephone will now be described with reference to FIGS. 9 and 10. The flow of FIG. 9 is started when a call signal is detected. In step 400, a URL function reply flag is cleared. This flag was set (step 501 in FIG. 10) when the URL function identification reply signal was transmitted in a previous call. In step 401, the reception line is connected to the user voice circuit and the URL function identifier 44. Since the called party's telephone is in the answering mode as described above, the transmission line is connected to the answer unit 20 for producing an answer message in step 402, and the answer message is produced and transferred to the transmission line in step 403. In step 404, it is checked whether the URL function reply flag is set. Since this flag was cleared in the first step 400, the flow proceeds to step 406 unless the flag has been set in step 501 in FIG. 10. Otherwise, step 405 is executed to transmit the URL function identification reply and set the URL function detection flag. The URL function detection flag set in step 405 is used to transmit and receive a URL or URLs between the calling and called parties while talking with each other and, therefore, is not required when the called party is in the answering mode. In step 406, the reception line is connected to the recording and reproducing unit 18 to record a voice message and URL (if any) from the caller's telephone.

The first voice input from the caller's telephone is received, for example, during the execution of step 403. When the reception of the voice input is detected, the flow of FIG. 10 is called, and it is checked in step 500 whether the voice input is a URL function identification request. If it is, the URL function reply flag is set in step 501. The flow of FIG. 10 is terminated if the voice input is not a URL function identification request, or after the URL function reply flag is set.

In the embodiment shown in FIGS. 6 to 10, a caller or calling party transmits a URL function identification request, and a called party detects the request and returns a URL function identification reply to the calling party. On the other hand, the called party may take the initiative in the URL function identification. In this case, the steps relating to the URL function identification request and the URL function identification reply in FIGS. 6 to 10 are reversed for the calling and called parties. That is, the calling party only makes a normal call, and does not transmit a URL function identification request even if it has the URL function. In response to the call, the called party transmits a URL function identification request to the calling party in a step similar to step 103 in FIG. 6, and sets the timer event (the flow of FIG. 7 is executed in the called party). The calling party detects the URL function identification request by a flow similar to FIG. 10, and returns a URL identification reply to the called party by a step similar to step 405 in FIG. 9. The calling party can now transmit a URL in addition to a voice message.

The URL recording in the answering mode which is the subject of the present invention will now be described in detail. As described above, the user of the calling telephone inputs, via the microphone 12, a voice message to be transmitted to the other party, and a URL from the input device 34 or the automatic URL fetching and display unit 38 when an answering message is received. In order to prevent erroneous inputs and to reduce the input workload, it is preferable to automatically fetch by the automatic URL fetching/display unit 38 and transmit a URL of a web page being currently displayed by the browser 30. When two lines can be used as in the communication form in FIG. 2, it is possible to use the function of the present invention by calling through one line while connecting to the Internet through the other line. Furthermore, according to the preferred embodiment, a cache function is provided for the browser 30 so that the contents of the web page and its URL can be displayed even after the line is disconnected, without reestablishing the connection, provided that it is done immediately after the disconnection. This browser function is a well known technique, and is implemented, for example, in Internet Explorer 4.0. Therefore, the URL displayed on the browser can be transmitted even with a single line since the browser need not be on-line. However, the browser's cache is not essential to the present invention since it is possible to disconnect the line while displaying a specific URL, switch to a telephone and transmit the URL being displayed even if the browser does not have a cache.

When a URL is inputted from the input device 34, a keyboard can be used to input it directly, or a portable telephone can be used in which a plurality of characters are assigned to each number button and a character is specified by the number of times a corresponding button is depressed. In the preferred embodiment, an additional function is provided for inputting a URL before calling in order to prevent the telephone charges from being increased while inputting the URL. For example, a URL stored in the browser may be used. The present invention is applicable even with a single telephone line since the browser equipped telephone of the present invention can be used as a conventional telephone by terminating the browser communication after a specific page has been displayed by the browser.

When the user specifies the URL transmission, the URL inputted from the input device 34 or automatically fetched by the automatic URL fetching and display unit 38 is passed to the URL encoder 42. For the communication form of FIG. 2 or 3, the URL encoder 42 temporarily halts the transmission of sound from the microphone 12 to the analog voice circuit 24 in order to prevent the URL from being altered due to noise, generates a predetermined tone signal (delimiter D1) indicating the beginning of the URL, and sends to the analog voice circuit 24 a signal obtained by encoding the URL. During the URL transmission, the encoded tone is outputted through the speaker 14 or through the handset to indicate that the microphone 12 can not be used for voice transmission. The user may also set to output no sound or a predetermined music during the URL transmission, instead of the encoded results. When the URL transmission has been completed, a tone signal (delimiter D2) indicating the end of the URL encoding is generated, and the input from the microphone 12 to the analog voice circuit 24 is resumed.

In the communication form of FIG. 4, switching between the URL and voice is done by indicating the beginning and end of a voice to the voice data modem 60 inserted between the analog voice circuit 24 and the telephone line to switch between the voice and signal. In the communication form of FIG. 5, the URL and voice can be simultaneously transmitted.

When the called party's telephone is in the answering mode, the incoming control 22 monitors the state of the telephone line continuously, outputs an incoming tone from the speaker 14 when an incoming call is detected, and starts answering and recording if an off-hook operation such as lifting the handset is not performed within a predetermined period of time. When the answering and recording operation is started, the answer unit 20 is used to transmit an answer message (step 403 in FIG. 9). Then, the URL function identifier 44 notifies of the presence of the URL function (step 405 in FIG. 9) to indicates that the called party's telephone can transmit and receive URLs. Thereafter, the recording reproducing unit 18 is used to record the output of the analog voice circuit 24. In this case, however, it is not essential to recognize that the caller has the URL transmission function, in which the called party may notify of the presence of the URL reception function and receive the URL, if any.

In the communication forms of FIGS. 2 and 3, the output of the analog voice circuit 24 is also always sent to the URL decoder 40 to obtain a URL in the form of character information by detecting the URL start tone and the URL end tone, and store it in a memory (not shown) used by the recording and reproducing unit 18. The URL start tone is recorded with the voice information, but the URL contents and the URL end tone are not. Thus, the presence/absence and the number of URLs can be displayed along with a count of recorded messages. In the preferred embodiment, the user can selectively decide whether the output to the speaker 14 should be halted during the URL reception.

In the above embodiments, the URL information is recorded as characters. However, the URL decoder 40 may only detect the presence/absence of a URL signal and halt the output to the speaker 14 as needed, and the URL contents may be recorded as voice information (tone signal).

In the communication form of FIG. 4, the voice data modem 60 is inserted between the analog voice circuit 24 and the telephone line, and voice and signal transmissions are switched by indicating the beginning and end of a voice to the modem 60 in the caller. In this case, it is possible to record the URL information as characters, generate a URL reproduction timing tone at the time of switching, and record the tone as a portion of a voice. In the communication form of FIG. 5, data and voice can be received simultaneously and, therefore, a URL received as data is recorded in association with a recorded speech.

When a user comes home and finds that a message has been received and recorded, he or she may issue an instruction from the input device 34 for the reproduction or playback of the message. In response thereto, the recording and reproducing unit 18 reproduces the recorded message. If a URL is included in the message as shown in FIG. 11, the presence of the URL is indicated at the time the message is reproduced. In the communication forms of FIGS. 2 to 4, it is possible to contain a URL start tone in a message and, therefore, the URL decoder 40 can obtain the URL from the memory depending on its timing, display it on the display device 32, and temporarily halt the reproduction of the message. When the user instructs to display the URL, the browser 30 is activated with the URL being specified in case the browser has not yet been activated. When the user instructs to continue the reproduction of the message, it is resumed while the URL remains displayed. When the user instructs to discard the URL, the URL is cleared. It is also possible to display the URL after the message has been reproduced.

In the communication form of FIG. 5, the URL and voice timings are not synchronized, and the URL is displayed at the same time that the reproduction of the recorded message is started to allow the user to activate the browser 30, discard the URL, or display the next URL. The user could instruct to display the URL after the reproduction of the recorded message if the URL is not discarded.

It should be noted that the browser can be used during the reproduction of the recorded message since the telephone line is not used at that time, a single telephone line may suffice. Further, when the URL information is recorded as a tone signal in the communication form of FIG. 2 or 3, it is also possible to halt the speaker output and start acquiring the URL by detecting the URL start tone during the reproduction of the message, and resume the speaker output after the URL is acquired.

In a conventional telephone call in which a called party is not in the answering mode, each party can recognize that the other party has the URL transmission and reception functions by detecting such functions. Therefore, it is also possible in the conventional telephone call to indicate whether the URL transmission and reception functions are available, based on the detected result. Further, if the URL transmission and reception functions are available, the URL transmission button could be depressed during the call to transmit and receive a URL in the same manner as in the answering mode, and, in the called party, to activate the browser 30 if it is not activated at the time the URL is received, and display the received URL. In addition, the URL may be transmitted and received through a single line by saving the received URL and activating the browser 30 to view the received URL after the line is disconnected.

The calling party may also use a conventional telephone by incorporating a voice recognition function therein. In the answering mode, the presence of a URL voice recognition function and an identification start keyword are notified as part of an answer message. In the normal conversation, the called party notifies during the conversation of the presence of the URL recognition function, or both the presence of the URL recognition function and the identification start keyword. In the called party, the received voice is also always sent to the voice recognition function to detect the keyword. The keyword here may be any sound that can be used for identification, such as an actual keyword like "start URL" or a specific combination of tones that are generated by the manipulation of telephone buttons.

When the sender uses the keyword, a voice identification mode is entered and the sender can communicate a URL to the receiver by pronouncing the URL. In the answering mode, voice recording is temporarily halted when the URL start keyword is received. After the keyword indicating the end of the URL is received, the sender may confirm the URL by depressing a button (e.g. "1" for end, "2" for confirmation) of the calling telephone to cause the called party to read the URL. After the URL is confirmed or in case the confirmation is omitted, the URL is saved as character data in association with the recording, and the voice recording is resumed. If the confirmation fails, the sender may cancel the URL by the button operation and either pronounce the URL again or stop transmitting the URL. When the recorded messages are reproduced, the number of URLs is displayed or read for each message, and the user can select either one of (1) display the URLs in order, (2) list the URLs for selective display, and (3) discard all URLs.

When the called party is not in the answering mode, it can receive the URL in the same manner, and it is also possible to enter the voice recognition mode by a user operation at the URL receiving side. Additionally, the confirmation results may also be displayed on the URL receiving telephone for confirmation by the user. The voice recognition through a telephone line is a well known technique such as IBM ViaVoice Speech Recognition, and the character to voice conversion is also a well known technique such as IBM Direct Talk.

The preferred embodiments of the present invention have been explained in detail. The present invention, however, is not limited thereto, and various modifications and changes are possible as would be apparent to those having ordinary skill in the art.

What is claimed is:

1. A browser equipped telephone capable of displaying a web page by a browser comprising:

an inputter which inputs a URL of a web page;

a transmitter which transmits the URL inputted by said inputter in a form that can be distinguished from a voice message;

a receiver adapted to receive a URL and associated voice message transmitted from the outside through an incoming telephone call;

an answerer which records and reproduces the URL and associated voice message received by said receiver;

a decoder which converts into a character format and sends to said browser said URL reproduced by said answerer; and wherein said browser having received the converted URL information displays said web page associated with the URL while said voice message is played.

2. The browser equipped telephone according to claim 1, wherein said inputter automatically fetches a URL of a web page being displayed and sends said URL to said transmitter.

3. The browser equipped telephone according to claim 1, further comprising a URL encoder which converts into a tone signal format the URL of a character format inputted by said inputter, wherein said decoder converts into a character format the URL of a tone signal format received by said receiver.

4. The browser equipped telephone according to claim 1, further comprising a URL function identifier which determines whether the telephone of the other party has a URL function.

5. The browser equipped telephone according to claim 4, wherein said URL function identifier transmits a URL function identification request at the time a call is placed, and transmits a URL function identification reply in response to a URL function identification request from the other party at the time a call is received.

6. The browser equipped telephone according to claim 4, wherein said URL function identifier transmits a URL function identification request to a calling party at the time a call is received, and returns a URL function identification reply to a called party in response to a URL function identification request from the called party.

7. The browser equipped telephone according claim 1, wherein said transmitter adds delimiters before and after said URL, respectively, and transmits the URL together with a voice message.

8. In a browser equipped telephone capable of displaying a web page by a browser, a method for recording a URL of a web page in an answering mode, comprising the steps of:
   inputting a URL;
   transmitting said URL in a form that can be distinguished from a voice message;
   receiving a URL and associated voice message that are transmitted from the outside through an incoming telephone call;
   recording and reproducing the received URL and associated voice message;
   converting the reproduced URL into a character format and providing it to said browser; and
   wherein said browser having received the converted URL information displays said web page associated with the URL while the voice message is played.

9. The method according to claim 8, wherein said URL inputting step automatically fetches a URL of a web page being displayed.

10. The method according to claim 8, further comprising the step of converting into a tone signal format the inputted URL of a character format, and said converting step converts a format of said received URL from a tone signal format into a character format.

11. The method according to claim 8, further comprising the step of determining whether the other party's telephone has a URL function.

12. The method according to claim 11, wherein said determining step transmits a URL function identification request at the time a call is placed, and returns a URL function identification reply in response to a URL function identification request from the other party at the time a call is received.

13. The method according to claim 11, wherein said determining step transmits a URL function identification request to a calling party at the time a call is received, and returns a URL function identification reply to a called party in response to a URL function identification request from the called party.

14. The method according to claim 8, wherein said transmitting step adds delimiters before and after said URL, respectively, and transmits the URL together with the voice message.

15. A program storage device readable by machine for tangibly embodying a program of instructions executable by said machine to perform, in a browser equipped telephone capable of displaying a web page by a browser, a method for recording a URL of a web page in an answering mode, said method comprising the steps of:
   inputting a URL;
   transmitting said URL in a form that can be distinguished from a voice message;
   receiving a URL and associated voice message that are transmitted from the outside through an incoming telephone call;
   recording and reproducing the received URL and associated voice message;
   converting the reproduced URL into a character format and providing it to said browser; and
   wherein said browser having received the converted URL information displays said web page associated with the URL while the voice message is played.

* * * * *